(12) United States Patent
Arai

(10) Patent No.: US 11,449,360 B2
(45) Date of Patent: Sep. 20, 2022

(54) INFORMATION PROCESSING APPARATUS, NON-TRANSITORY COMPUTER-READABLE STORAGE MEDIUM FOR STORING INFORMATION PROCESSING PROGRAM, AND INFORMATION PROCESSING METHOD

(71) Applicant: FUJITSU LIMITED, Kawasaki (JP)

(72) Inventor: Masaki Arai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 166 days.

(21) Appl. No.: 16/941,590

(22) Filed: Jul. 29, 2020

(65) Prior Publication Data

US 2021/0081239 A1   Mar. 18, 2021

(30) Foreign Application Priority Data

Sep. 13, 2019   (JP) .............................. JP2019-167698

(51) Int. Cl.
  *G06F 9/48*    (2006.01)
  *G06F 9/50*    (2006.01)
  (Continued)

(52) U.S. Cl.
  CPC .......... *G06F 9/4881* (2013.01); *G06F 9/3836* (2013.01); *G06F 9/48* (2013.01);
  (Continued)

(58) Field of Classification Search
  CPC ........ G06F 9/48; G06F 9/4881; G06F 9/5072; G06F 9/3836; G06F 9/3863;
  (Continued)

(56) References Cited

U.S. PATENT DOCUMENTS 6,549,815 B1    4/2003  Kaji
2016/0350074 A1* 12/2016 Choi .................... G06F 9/44

FOREIGN PATENT DOCUMENTS

JP   H11-110367 A     4/1999
JP   2000-250603 A    9/2000
JP   2019-040431 A    3/2019

OTHER PUBLICATIONS

Samadi et al, "Paraprox: Pattern-Based Approximation for Data Parallel Applications", ASPLOS'14, Mar. 1-5, 2014, ACM, pp. 35-50 (Year: 2014).*

Kao et al, "Hermes: Latency Optimal Task Assignment for Resource-constrained Mobile Computing", IEEE Transactions On Mobile Computing, vol. 16, No. 11, Nov. 2017, pp. 3056-3069 (Year: 2017).*

(Continued)

*Primary Examiner* — Charles M Swift
(74) *Attorney, Agent, or Firm* — Fujitsu Patent Center

(57) ABSTRACT

An information processing apparatus, a non-transitory computer-readable storage medium for storing an information processing program, and an information processing method are described. In an embodiment, provided is a solution to efficiently determine a degree to which each of a plurality of simplification processes is applied to a program. For example, an information processing apparatus includes: a storage device that stores program instructions; and a processor that executes the program instructions including selecting a first candidate value from among a plurality of candidate values included in a first set, based on an evaluation result for a plurality of execution results generated at a first position, and selecting a second candidate value from among the plurality of candidate values included in a second set, based on an evaluation result for the plurality of execution results generated at a second position.

3 Claims, 15 Drawing Sheets

(51) Int. Cl.
  *G06F 16/245*   (2019.01)
  *G06F 16/2455*  (2019.01)
  *G06F 16/2458*  (2019.01)
  *G06F 9/38*     (2018.01)
  *G06F 16/2453*  (2019.01)

(52) U.S. Cl.
  CPC .............. *G06F 9/4843* (2013.01); *G06F 9/50* (2013.01); *G06F 9/5038* (2013.01); *G06F 9/5072* (2013.01); *G06F 9/5077* (2013.01); *G06F 16/245* (2019.01); *G06F 16/2453* (2019.01); *G06F 16/2455* (2019.01); *G06F 16/2458* (2019.01); *G06F 16/2462* (2019.01); *G06F 16/2468* (2019.01); *G06F 16/2471* (2019.01)

(58) Field of Classification Search
  CPC ........ G06F 8/4441; G06F 9/4843; G06F 9/50; G06F 9/5038; G06F 9/5077; G06F 16/245; G06F 16/2453; G06F 16/2455; G06F 16/2458; G06F 16/2462; G06F 16/2468; G06F 16/2471
  See application file for complete search history.

(56) References Cited

OTHER PUBLICATIONS

Sampson, Adrian et al.,"ACCEPT: A Programmer-Guided Compiler Framework for Practical Approximate Computing", Jan. 4, 2015, XP55763509, Retrieved from the Internet: URL:https://dada.cs.washington.edu/research/tr/2015/01/UW-CSE-15-01-01.pdf [retrieved on Jan. 11, 2021], pp. 1-14.

Simmons-Edler, Riley et al.,"Program Synthesis Through Reinforcement Learning Guided Tree Search", arxiv.org, Cornell University Library, 201, Olin Library Cornell University Ithaca, Ny 14853, Jun. 8, 2018, pp. 1-11, XP080888398.

Lokuciejewski, Paul et al.,"Approximating Pareto optimal compiler optimization sequences—a trade-off between WCET, ACET and code size", Software: Practice and Experience, vol. 41, No. 12, May 23, 2011, pp. 1437-1458, XP055010493.

Barua, Hrishav Bakul et al.,"Approximate Computing: A Survey of Recent Trends—Bringing Greenness to Computing and Communication", Journal of the Institution of Engineers (India): Series B, Springer India, India, vol. 100, No. 6, Jun. 20, 2019, pp. 619-626, XP036933885.

Extended European Search Report dated Jan. 27, 2021 for corresponding European Patent Application No. 20188591.0, 13 pages.

European Office Action dated Oct. 25, 2021 for corresponding European Patent Application No. 20188591.0, 7 pages. ***Please note D1 NPL Adrian Sampson et al., "Accept" A Programmer-Guided Compiler Framework.

* cited by examiner

FIG. 5

```
program () {
501    double A[N], B[N], C[N];
       double x, y, z, result;
502
       ...
       for (i = 0; i < N; i++) {
           ...
503        x = ...;
           ...
           for (j = 0; j < N; j++) {
               ...
504            y = ...;
               ...
           }
       }
505    z = ...;
       for (k = 0; k < N; k++) {
           ...
506        A[k] = B[k] * C[k];
           ...
       }
507    return result;
}
```

FIG. 6

| NAME | VARIABLE | LINE NUMBER | MINIMUM VALUE | MAXIMUM VALUE |
|---|---|---|---|---|
| c1 | x | 7 | -1.0 | 1.0 |
| c2 | y | 11 | -100.0 | 100.0 |
| c3 | z | 15 | -1000.0 | 1000.0 |
| c4 | result | 21 | -0.1 | 0.1 |

FIG. 7

```
program () {
    double A[N], B[N], C[N];      501
    double x, y, z, result;        502
    ...
    for (i = 0; i < N; i++) {
        ...
        x = ...;                   503
        #pragma AC checkpoint c1 x 701
        ...
        for (j = 0; j < N; j++) {
            ...
            y = ...;               504
            #pragma AC checkpoint c2 y 702
            ...
        }
    }
    z = ...;                       505
    #pragma AC checkpoint c3 z     703
    for (k = 0; k < N; k++) {
        ...
        A[k] = B[k] * C[k];        506
        ...
    }
    #pragma AC checkpoint c4 result 704
    return result;                 507
}
```

FIG. 8

```
program () {
    double A[N], B[N], C[N];          // 501
    double x, y, z, result;           // 502
    ...
    #pragma AC parallel (p1)          // 801
    for (i = 0; i < N; i++) {
        ...
        x = ...;                      // 503
        #pragma AC checkpoint c1 x    // 701
        ...
        #pragma AC loop_perforation (p2)  // 802
        for (j = 0; j < N; j++) {
            ...
            y = ...;                  // 504
            #pragma AC checkpoint c2 y  // 702
            ...
        }
    }
    z = ...;                          // 505
    #pragma AC checkpoint c3 z        // 703
    #pragma AC precision (p3)         // 803
    for (k = 0; k < N; k++) {
        ...
        A[k] = B[k] * C[k];           // 506
        ...
    }
    #pragma AC checkpoint c4 result   // 704
    return result;                    // 507
}
```

FIG. 12

```
         program () {
501 ─────── double A[N], B[N], C[N];
502 ─────── double x, y, z, result;
           ...
1201 ────── #pragma AC parallel (16)
           for (i = 0; i < N; i++) {
               ...
503 ─────── x = ...;
701 ─────── #pragma AC checkpoint c1 x
               ...
1202 ────── #pragma AC loop_perforation (2)
           for (j = 0; j < N; j++) {
               ...
504 ─────── y = ...;
702 ─────── #pragma AC checkpoint c2 y
               ...
           }
           }
505 ─────── z = ...;
703 ─────── #pragma AC checkpoint c3 z
1203 ────── #pragma AC precision (32)
           for (k = 0; k < N; k++) {
               ...
506 ─────── A[k] = B[k] * C[k];
               ...
           }
704 ─────── #pragma AC checkpoint c4 result
507 ─────── return result;
         }
```

INFORMATION PROCESSING APPARATUS, NON-TRANSITORY COMPUTER-READABLE STORAGE MEDIUM FOR STORING INFORMATION PROCESSING PROGRAM, AND INFORMATION PROCESSING METHOD

CROSS-REFERENCE TO RELATED APPLICATION

This application is based upon and claims the benefit of priority of the prior Japanese Patent Application No. 2019-167698, filed on Sep. 13, 2019, the entire contents of which are incorporated herein by reference.

FIELD

The embodiment discussed herein is related to an information processing apparatus, a non-transitory computer-readable storage medium for storing an information processing program, and an information processing method.

BACKGROUND

In recent years, many approximate computing (AC) techniques for changing the precision of the accuracy of an execution result within a range allowed by a user have been proposed for the purpose of increasing the execution speed of a program and reducing power consumption in execution of the program. AC techniques include techniques such as AC parallelization, loop perforation, task skipping, and bit number reduction.

The AC parallelization is a process of aborting waiting of a plurality of processes executed in parallel, which is written in a program. The loop perforation is a process of skipping some of iterations of loop processing. The task skipping is a process of skipping execution of a part of program code. The bit number reduction is a process of reducing the number of bits of a variable used in calculation. The degree to which each AC technique is applied to the program is designated by a parameter.

One or a plurality of AC techniques are applicable to one program. When a plurality of AC techniques are applied, the synergistic effect of the AC techniques may enhance the speed-increasing effect and the power-consumption reducing effect of the program.

In relation to optimization of a program, there is known an integrated characteristic optimization method in which a control parameter in a control module is optimized using a direct optimization technique. There are also known an automatic adjustment apparatus of an evaluation structure/parameter in an overall evaluation of the state of a plant, and an abnormality determination apparatus that determines an abnormality of a target apparatus in view of a correlation among a plurality of parameters.

Examples of the related art include Japanese Laid-open Patent Publication No. 2000-250603, Japanese Laid-open Patent Publication No. 11-110367, and Japanese Laid-open Patent Publication No. 2019-40431.

SUMMARY

According to an aspect of the embodiments, an information processing apparatus includes: a storage device that stores a program; and a processor that executes the program, wherein the processor is configured to: generate a first set of candidate values for a parameter that indicates a degree to which a first simplification process is applied and a second set of candidate values for a parameter that indicates a degree to which a second simplification process is applied, the first simplification process being a process of executing the program simplified at a first position in the program, the second simplification process being a process of executing the program simplified at a second position that follows the first position; generate a plurality of execution results by executing the program simplified at the first position based on the plurality of respective candidate values included in the first set; select a first candidate value from among the plurality of candidate values included in the first set, based on an evaluation result for the plurality of execution results generated at the first position; generate a plurality of execution results by executing the program simplified at the second position based on the plurality of respective candidate values included in the second set, by using an execution result generated by executing the program simplified at the first position based on the first candidate value; and select a second candidate value from among the plurality of candidate values included in the second set, based on an evaluation result for the plurality of execution results generated at the second position.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating a program;

FIG. 6 is a diagram illustrating allowable accuracy information;

FIG. 7 is a diagram illustrating a checkpoint-added program;

FIG. 8 is a diagram illustrating an adjustment program;

FIG. 12 is a diagram illustrating an AC-applied program;

DESCRIPTION OF EMBODIMENT(S)

When a plurality of AC techniques are applied to an application program, there are circumstances that it may be difficult to control the interaction or synergistic effect of the AC techniques.

Such circumstances occur not only when the AC techniques are applied to a program but also when various simplification processes of executing a program in a simplified manner are applied.

In one aspect of embodiments, provided is a solution to efficiently determine a degree to which each of a plurality of simplification processes is applied to a program.

An embodiment be described in detail below with reference to the drawings.

When an AC technique is applied to an application program, a user determines a degree to which the AC technique is applied to which part of the program. When the AC technique is applied to an inappropriate part of the program or when the AC technique is excessively applied, the accuracy of the execution result of the program may deteriorate more than the user allows or the program is terminated in error during execution. When a plurality of AC techniques are applied to a single application program, it is difficult to control the interaction or synergistic effect of the AC techniques.

When an application program is executed for each of many pieces of input data, the result of applying an AC technique may vary from one piece of input data to another. For example, a case is assumed where a certain piece of input data is input to a program to which an AC technique is applied, and where an execution result with an accuracy within an allowable range designated by a user is obtained. In this case, when an other piece of input data is input to the same program, there may occur a situation in which an execution result with an accuracy out of the allowable range is obtained or the execution result becomes an error.

When such a situation occurs, it consequently turns out that the application of the AC technique to the other piece of input data is inappropriate, and the original application program is executed for the other piece of input data. For this reason, the execution time of the program to which the AC technique is applied is wasted, causing a large amount of wasted time.

Figure 1:
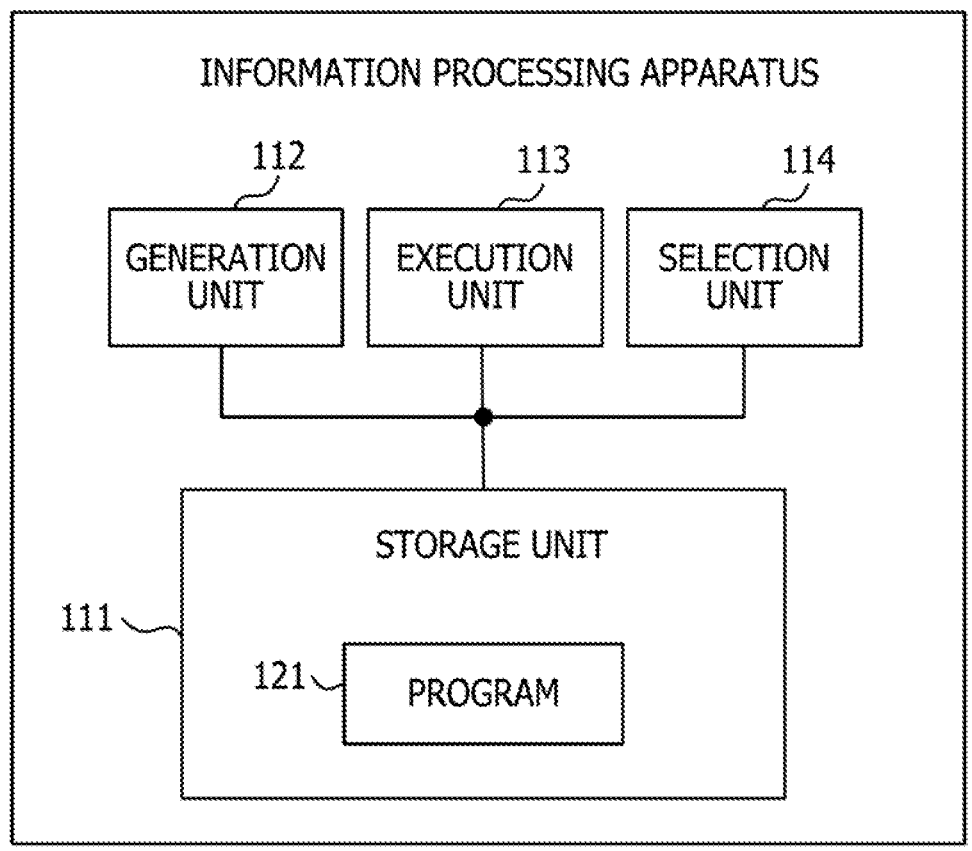
FIG. 1 is a functional configuration diagram of an information processing apparatus.

FIG. 1 illustrates an example of a functional configuration of an information processing apparatus (computer) according to an embodiment. An information processing apparatus 101 illustrated in FIG. 1 includes a storage unit 111 that stores a program 121, a generation unit 112, an execution unit 113, and a selection unit 114.

Figure 2:
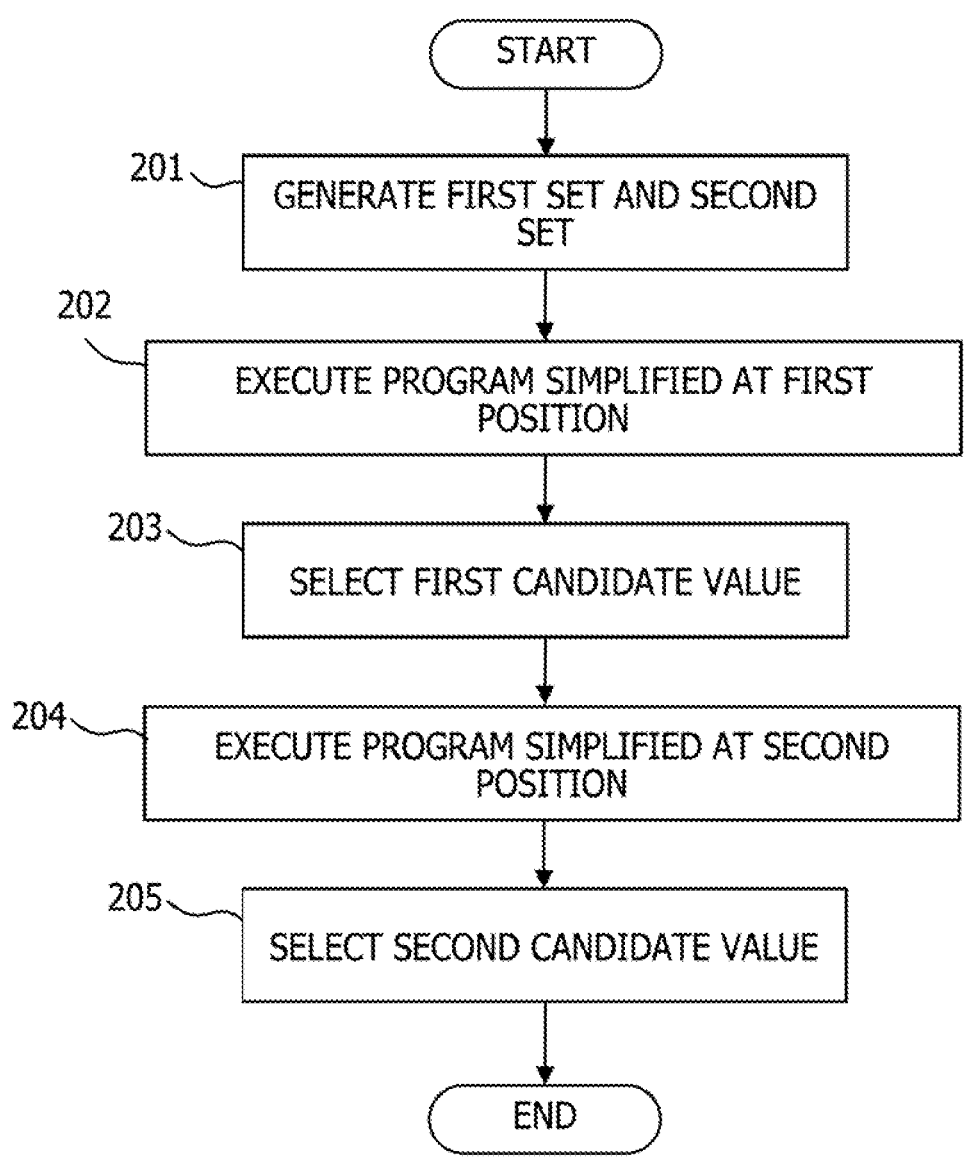
FIG. 2 is a flowchart of a parameter determination process.

FIG. 2 is a flowchart illustrating an example of a parameter determination process performed by the information processing apparatus 101 illustrated in FIG. 1. First, the generation unit 112 generates a first set of candidate values for a parameter that indicates a degree to which a first simplification process is applied and a second set of candidate values for a parameter that indicates a degree to which a second simplification process is applied (step 201). The first simplification process is a simplification process of executing the program 121 simplified at a first position in the program 121. The second simplification process is a simplification process of executing the program 121 simplified at a second position that follows the first position.

Next, the execution unit 113 generates a plurality of execution results by executing the program 121 simplified at the first position based on the plurality of respective candidate values included in the first set (step 202). The selection unit 114 selects a first candidate value from among the plurality of candidate values included in the first set, based on an evaluation result for the plurality of execution results generated at the first position (step 203).

Next, the execution unit 113 generates a plurality of execution results by executing the program 121 simplified at the second position based on the plurality of respective candidate values included in the second set (step 204). At this time, the execution unit 113 executes the program 121 using an execution result generated by executing the program 121 simplified at the first position based on the first candidate value. The selection unit 114 selects a second candidate value from among the plurality of candidate values included in the second set, based on an evaluation result for the plurality of execution results generated at the second position (step 205).

The information processing apparatus 101 illustrated in FIG. 1 may efficiently determine a degree to which each of a plurality of simplification processes is applied to a program.

Figure 3:
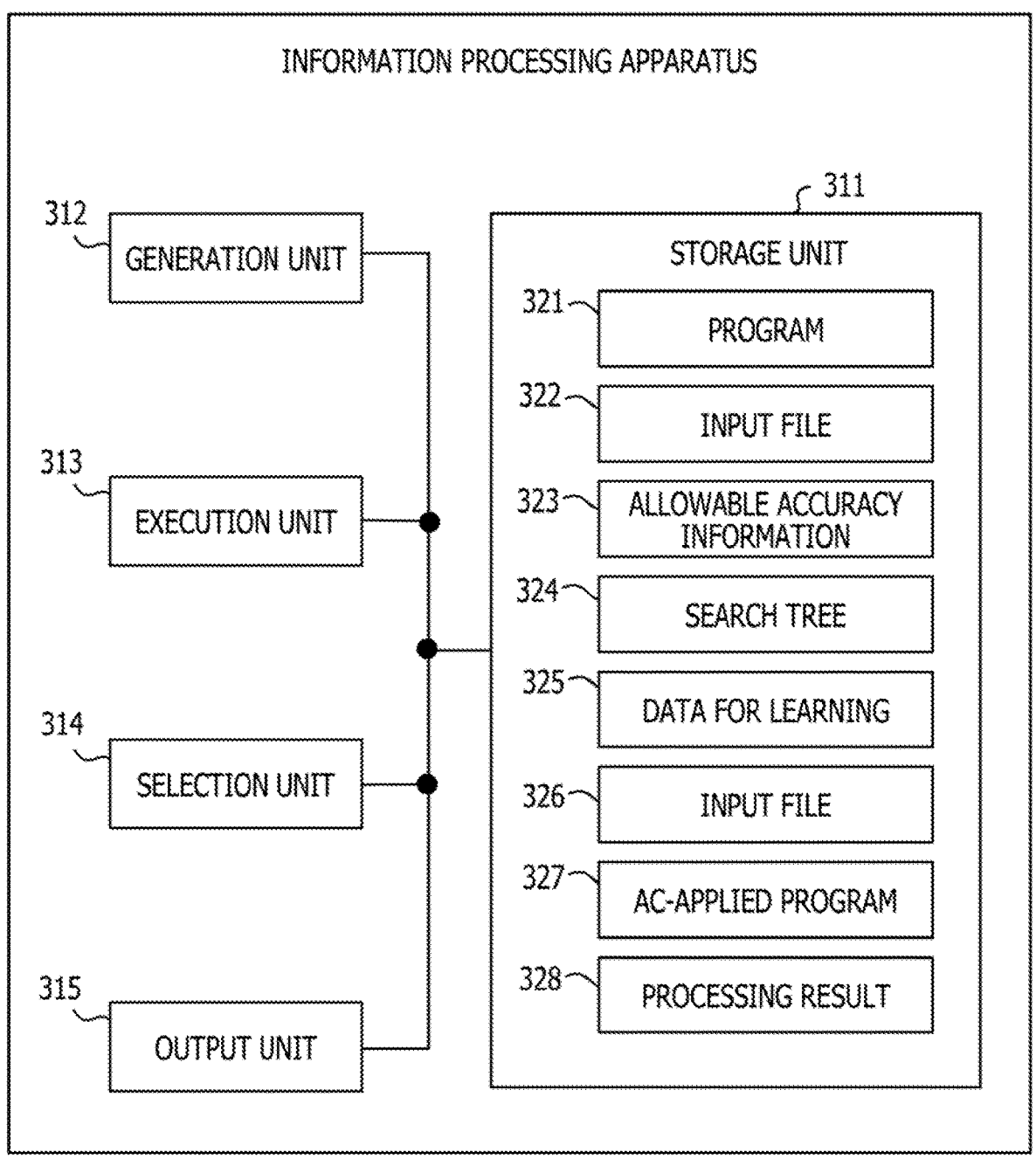
FIG. 3 is a functional configuration diagram illustrating a specific example of the information processing apparatus.

FIG. 3 illustrates a specific example of the information processing apparatus 101 illustrated in FIG. 1. An information processing apparatus 301 illustrated in FIG. 3 includes a storage unit 311, a generation unit 312, an execution unit 313, a selection unit 314, and an output unit 315. The storage unit 311, the generation unit 312, the execution unit 313, and the selection unit 314 correspond to the storage unit 111, the generation unit 112, the execution unit 113, and the selection unit 114 illustrated in FIG. 1, respectively.

The storage unit 311 stores a program 321, an input file 322, allowable accuracy information 323, a search tree 324, data for learning 325, and an input file 326. The program 321 corresponds to the program 121 illustrated in FIG. 1, and is an example of a target program to which an AC technique is applied and for which the preciseness of a processing result is not necessarily desired. The AC technique is an example of a simplification process of executing the program 321 in a simplified manner.

For example, the program 321 may be a program for big data analysis, machine learning, information search, video processing, or the like. As the AC technique, AC parallelization, loop perforation, task skipping, bit number reduction, or the like is applied.

The information processing apparatus 301 has two operation modes which are an adjustment mode and an operation mode. In the adjustment mode, the information processing apparatus 301 determines a combination of a plurality of AC techniques to be applied to the program 321 and respective parameter values of the AC techniques, and generates an AC-applied program 327 to which the determined combination of the AC techniques and the parameter values has been applied. In the operation mode, the information processing apparatus 301 executes the AC-applied program 327.

The input file 322 includes adjustment data input to the program 321 in the adjustment mode. The allowable accuracy information 323 indicates an allowable range of the accuracy of a value of each variable at each position in the program 321. The search tree 324 is data of a tree structure including nodes each for recording an AC technique and a parameter thereof that are attempted in the adjustment mode. The data for learning 325 is data indicating an evaluation result for combinations of an AC technique and a parameter value recorded in respective nodes of the search tree 324. The input file 326 includes processing-target data input to the program 321 in the operation mode.

In the adjustment mode, the information processing apparatus 301 performs a search process of searching for an optimum combination of the AC techniques and the respective parameter values by using a parallel processing technique. In the search process, the information processing apparatus 301 generates a plurality of execution results by executing the program 321 to which a plurality of respective combinations of the AC technique and the parameter value are applied in parallel using the input file 322.

The information processing apparatus 301 aborts execution of the program 321 for which the accuracy of the execution result is out of the allowable range. On the other hand, the information processing apparatus 301 further increases the number of AC techniques to be applied and executes the program 321 for which the execution result with the accuracy within the allowable range is obtained to generate a plurality of execution results. By repeating such parallel processing, an optimum combination is efficiently searched for, and the processing time of the search process may be significantly decreased compared to the case where individual combinations are attempted one by one.

In the search process, the generation unit 312 generates a set of parameter values (candidate values) serving as candidates for a parameter of an AC technique to be applied at each position in the program 321. The set of parameter values may include a parameter value indicating that the AC technique is not to be applied.

Next, the execution unit 313 generates a plurality of execution results by applying the AC technique to the program 321 based on the plurality of respective parameter values included in the set and by executing the program 321. The selection unit 314 evaluates the plurality of execution results generated at each position, generates evaluation results indicating whether the accuracies of the respective execution results are within the allowable range, and selects one of the parameter values included in the set based on the evaluation results.

At this time, the selection unit 314 selects a parameter value having an evaluation result indicating that the accuracy of the execution result at each position is within the allowable range. Consequently, the search using the parameter value that generates the execution result with the accuracy within the allowable range is promoted, and a combination of optimum parameter values may be obtained in a short time.

When an evaluation result indicating that the accuracy of the execution result is out of the allowable range is obtained for any of the parameter values, the selection unit 314 aborts the search process using the execution result based on the parameter value. Consequently, the search using the parameter value that has generated the execution result with the accuracy out of the allowable range is terminated, and the unnecessary search may be omitted.

In the search process, reinforcement learning based on the search tree 324 is used. This makes it possible to efficiently attempt promising combinations even when there are a large number of candidates for the combination of the AC technique and the parameter value.

The selection unit 314 generates the AC-applied program 327 by applying the optimum combination of the AC techniques and the parameter values determined through the search process to the program 321, and stores the generated AC-applied program 327 in the storage unit 311.

In the operation mode, the execution unit 313 executes, using the input file 326, the AC-applied program 327 in which the AC technique is applied at each position in the program 321. Since the input file 326 is different from the input file 322 used in the adjustment mode, application of the optimum combination of the AC techniques and the parameter values may result in an execution result with an accuracy out of the allowable range or an error in the execution result.

In this case, the execution unit 313 applies the AC technique again using an other parameter value recorded in the node of the search tree 324, and executes the AC-applied program 327 again from the position at which the AC technique is applied. When the other parameter value indicates that the AC technique is not to be applied, the execution unit 313 executes the AC-applied program 327 again without applying the AC technique at the position.

Consequently, when an execution result with an accuracy out of the allowable range is obtained or the execution result becomes an error due to the application of the AC technique, a possibility that the execution of the AC-applied program 327 is successfully completed without wasting the execution time up until then increases. Therefore, the return time due to the execution of the AC-applied program 327 may be significantly reduced.

The execution unit 313 generates a processing result 328 by executing the AC-applied program 327, and stores the processing result 328 in the storage unit 311. Then, the output unit 315 outputs the processing result 328.

Figure 4:
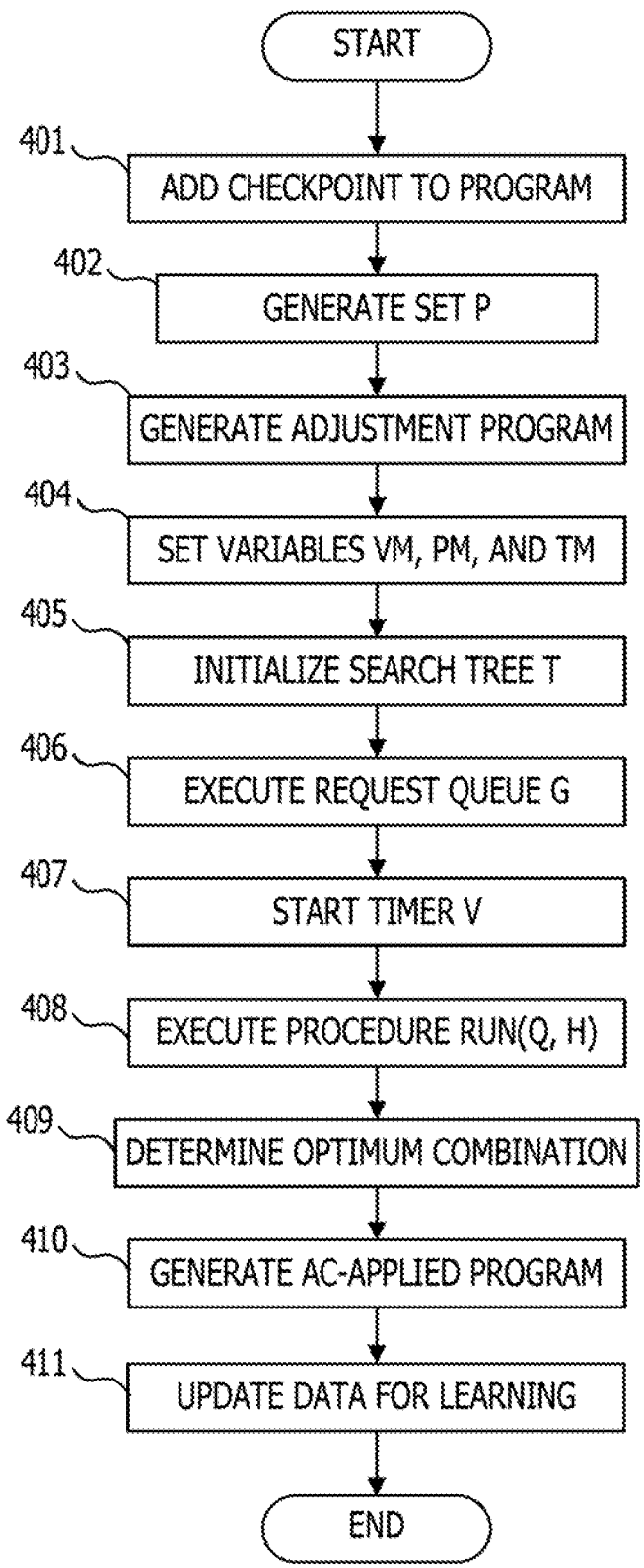
FIG. 4 is a flowchart of a search process.

FIG. 4 is a flowchart illustrating an example of the search process performed by the information processing apparatus 301 illustrated in FIG. 3 in the adjustment mode. First, the generation unit 312 adds a checkpoint to the program 321 based on the allowable accuracy information 323 to generate a checkpoint-added program (step 401). A checkpoint represents processing of checking whether the accuracy of a variable is within an allowable range at a position designated by the allowable accuracy information 323 in the program 321.

FIG. 5 illustrates an example of the program 321. A declarative statement 501 is a declarative statement regarding an array A, an array B, and an array C. A declarative statement 502 is a declarative statement regarding a variable x, a variable y, a variable z, and a variable result. An executable statement 503 indicates that the value of the variable x is to be defined. An executable statement 504 indicates that the value of the variable y is to be defined. An executable statement 505 indicates that the value of the variable z is to be defined. An executable statement 506 indicates that an element A[k] (k=0 to N−1) of the array A is defined as the product of an element B[k] of the array B and an element C[k] of the array C. An executable statement 507 indicates an operation of returning the value of the variable result to the caller.

FIG. 6 illustrates an example of the allowable accuracy information 323 for the program 321 illustrated in FIG. 5. The allowable accuracy information 323 illustrated in FIG. 6 is set by a user and includes a name, a variable, a line number, a minimum value, and a maximum value. The name is identification information of a checkpoint. The variable represents a variable to be checked. The line number represents the number assigned to a line in which the variable to be checked is written in the program 321. The minimum value represents the lower limit of the value of the variable to be checked. The maximum value represents the upper limit of the value of the variable to be checked.

For example, a checkpoint c1 is processing of checking the value of the variable x included in the executable statement 503 written in line 7 of the program 321 illustrated in FIG. 5, and the minimum value is −1.0 and the maximum value is 1.0. Therefore, when the value of the variable x generated by the executable statement 503 is greater than or equal to −1.0 and is less than or equal to 1.0, it is determined that the accuracy of the value of the variable x is within the allowable range. When the value of the variable x is less than −1.0 or is greater than 1.0, it is determined that the accuracy is out of the allowable range.

FIG. 7 illustrates an example of a checkpoint-added program to which the checkpoints c1 to c4 illustrated in FIG. 6 are added. Pragmas 701 to 704 represent the checkpoints c1 to c4, respectively.

Next, the generation unit 312 analyzes the source code of the program 321 by applying a compiler technique. Consequently, a triad p=(c, d, E) is generated which includes a position c in the program 321 to which an AC technique is applied, a type d of the AC technique applied to the position c, and a set E of parameter values e of the AC technique to be applied. The generation unit 312 generates a set P including a plurality of triads p (step 402). The triad p represents a combination of an AC technique and a plurality of parameter values.

For example, AC parallelization, loop perforation, task skipping, bit number reduction, or the like is used as the type d of the AC technique. A parameter value e, which is an element of the set E, represents a degree to which the AC technique of the type d is applied.

The elements of the set E are sorted in advance in ascending order of the degree to which the AC technique is applied. An element with a smaller degree to which the AC technique is applied is an element with a less speed-increasing effect and a less deterioration in calculation accuracy. An element with a larger degree to which the AC technique is applied is an element with a greater speed increasing effect and a greater deterioration in calculation accuracy. The set E also includes the parameter value e indicating that the AC technique is not to be applied, as an element with the smallest degree to which the AC technique is applied.

Next, the generation unit 312 generates an adjustment program by inserting a pragma for applying each element of the set P into the checkpoint-added program (step 403).

FIG. 8 illustrates an example of an adjustment program generated from the checkpoint-added program illustrated in FIG. 7. In this example, the set P includes triads as follows: p1=(5, parallel, {16, 8}); p2=(11, loop perforation, {0, 2, 3}); and p3=(21, precision, {64, 32}).

In the triad p1, "5" represents the position (line 5) in the adjustment program, "parallel" represents AC parallelization, and {16, 8} represents a set E including a parameter value "16" and a: parameter value "8" as elements. The parameter value e of the AC parallelization indicates that, in barrier synchronization in which completion of a plurality of processes to be executed in parallel is waited for, when e processes are completed, the remaining uncompleted processes are aborted. Therefore, the smaller the parameter value e, the greater the degree to which AC parallelization is applied. The parameter value "16" is a parameter value indicating that AC parallelization is to be not applied.

In the triad p2, "11" represents the position (line 11) in the adjustment program, and "loop_perforation" represents loop perforation. In addition, {0, 2, 3} represents a set E including a parameter value "0", a parameter value "2", and a parameter value "3" as elements. The parameter value e of the loop perforation indicates the number of times of iterations that are skipped in loop processing. Therefore, the greater the parameter value e, the greater the degree to which the loop perforation is applied. The parameter value "0" is a parameter value indicating that the loop perforation is not to be applied.

In the triad p3, "21" represents the position (line 21) in the adjustment program, "precision" represents bit number reduction, and {64, 32} represents a set E including a parameter value "64" and a parameter value "32" as elements. The parameter value e of the bit number reduction indicates the number of bits of the variable after the bit number reduction. Therefore, the smaller the parameter value e, the greater the degree to which the bit number reduction is applied. The parameter value "64" is a parameter value indicating that the bit number reduction is not to be applied.

Pragmas 801 to 803 illustrated in FIG. 8 respectively represent that the three triads p1 to p3 are to be applied.

Next, the selection unit 314 sets the values of a variable VM, a variable PM, and a variable TM used for controlling the search process (step 404). The variable VM represents the upper limit of the processing time of the search process. The variable PM represents the upper limit of the number of processes that operate simultaneously in the search process. The variable TM represents the upper limit of the execution time of one process. The values of the variable VM, the variable PM, and the variable TM may be determined by executing the program 321 in advance, for example.

Next, the selection unit 314 initializes a search tree T corresponding to the search tree 324 (step 405). Thus, T={} is obtained.

Next, the selection unit 314 starts execution of a request queue G (step 406), and resets a timer V to 0 to start measuring the elapsed time (step 407).

Next, the execution unit 313 starts execution of the adjustment program using the input file 322, and executes a procedure RUN(Q, H) using a program image Q and a history H as arguments (step 408). The selection unit 314 waits for the end of the execution of the request queue G.

Q is identification information indicating a program image. The history H represents a combination of an AC technique and a parameter value employed in the search process. At this point, H={⊥} holds, where ⊥ represents the root node of the search tree T.

When the execution of the request queue G is ended, the search tree T is obtained which includes the combinations of the AC technique and the parameter value capable of performing the fastest calculation with the accuracy within the allowable range indicated by the allowable accuracy information 323.

Therefore, the selection unit 314 checks information recorded in leaf nodes of the search tree T and selects a leaf node having the highest speed-increasing effect. The selection unit 314 determines an optimum combination of the AC techniques and the parameter values by sequentially tracing the nodes from the leaf node to the root node (step 409).

Next, the selection unit 314 generates the AC-applied program 327 by applying the determined AC techniques and parameter values to the adjustment program (step 410). The selection unit 314 extracts information on the parameter value for which execution is successful and the parameter value for which execution is unsuccessful from individual nodes of the search tree T and records the information in the data for learning 325, thereby updating the data for learning 325 (step 411).

Figure 9A:
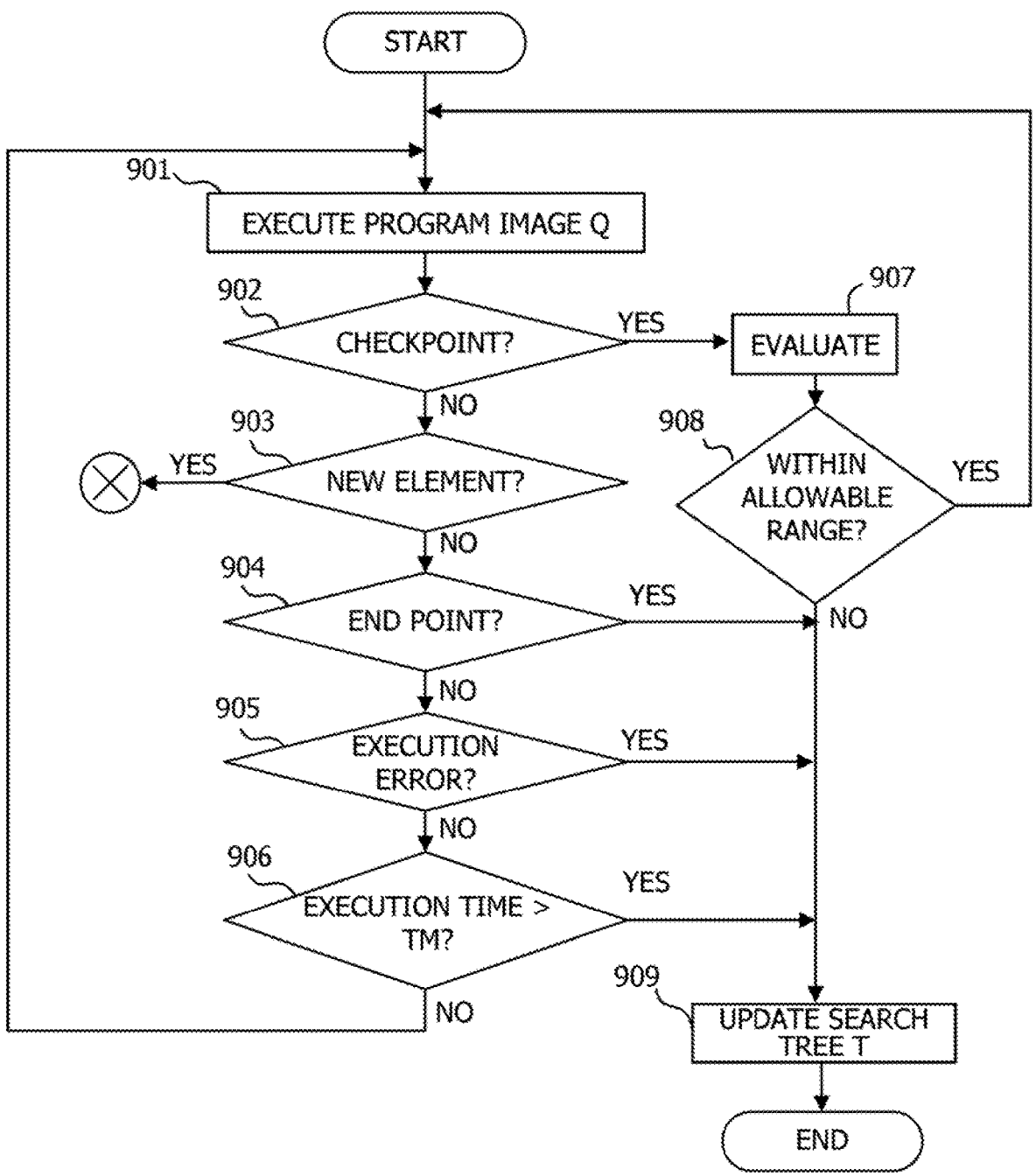
FIG. 9A is a flowchart (part 1) of a procedure RUN(Q, H)
Figure 9B:
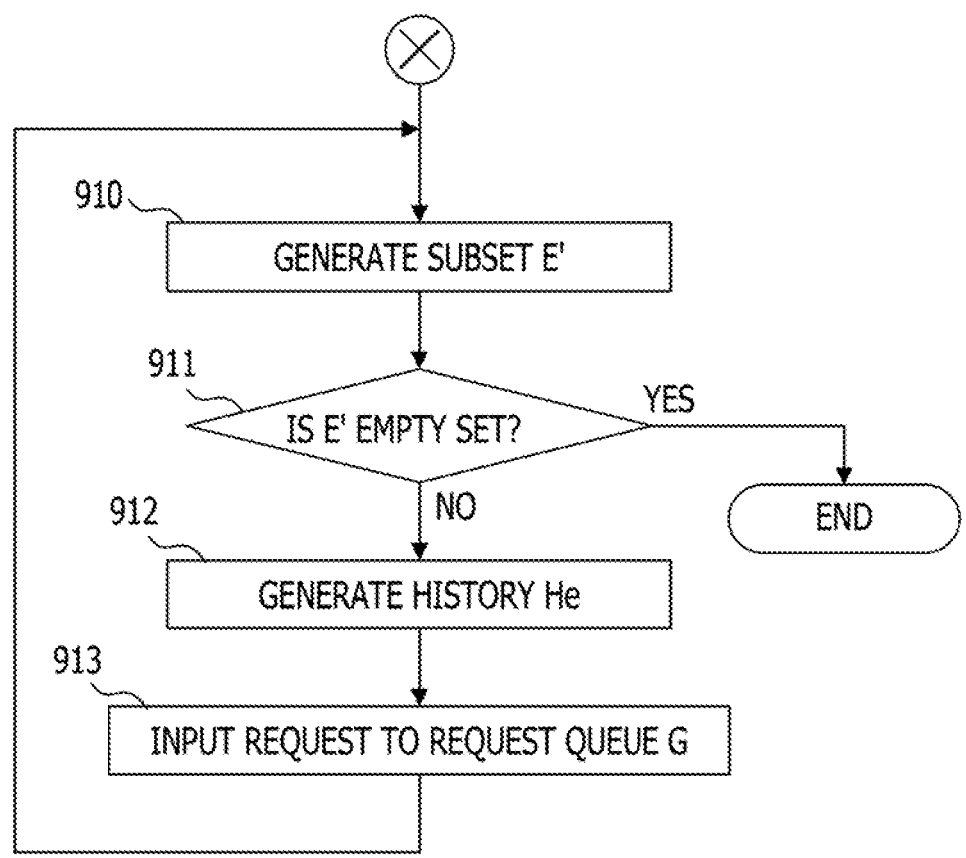
FIG. 9B is a flowchart (part 2) of the procedure RUN(Q, H)

FIGS. 9A and 9B are flowcharts illustrating an example of the procedure RUN(Q, H) executed in step 408 of FIG. 4 First, the execution unit 313 executes the program image Q (step 901), and checks whether the execution position has reached the position of the checkpoint (step 902).

If the execution position has reached the position of the checkpoint (YES in step 902), the selection unit 314 evaluates the accuracy of the value of the variable at the checkpoint (step 907), and determines whether the accuracy is within the allowable range (step 908). If the value of the variable is greater than or equal to the minimum value and is less than or equal to the maximum value, it is determined that the accuracy is within the allowable range. If the value of the variable is less than the minimum value or is greater than the maximum value, it is determined that the accuracy is out of the allowable range.

If the accuracy is within the allowable range (YES in step 908), the information processing apparatus 301 repeats the processing of step 901 and subsequent steps. On the other hand, if the accuracy is out of the allowable range (NO in step 908), the selection unit 314 determines that the execution of the program image Q has failed, aborts the execution of the program image Q, and updates the search tree T (step 909). The execution unit 313 ends the execution of the procedure RUN(Q, H). A method for updating the search tree T will be described later.

If the execution position has not reached the position of the checkpoint (NO in step 902), the execution unit 313 checks whether the execution position has reached the position of a new element of the set P (step 903). The new element represents a triad p that has never been processed among the triads p included in the set P.

If the execution position has reached the position of the new element of the set P (YES in step 903), the generation unit 312 generates a subset. $E' \subseteq E$ of parameter values to be attempted from the set E including the triad p=(c, d, E) of the element (step 910). The subset E' is an example of a set of candidate values for the parameter of the AC technique. A method for generating the subset E' will be described later.

Next, the selection unit 314 checks whether the subset E' is an empty set (step 911). If the subset E is an empty set (YES in step 911), the execution unit 313 ends the execution of the procedure RUN(Q, H).

On the other hand, if the subset E' is not an empty set (NO in step 911), the selection unit 314 generates a history He for each parameter value e included in the subset E' (step 912). The history He is generated by copying the history H of the procedure RUN(Q, H) and adding the triad (c, d, e) to the end of the copy of the history H.

Next, the selection unit 314 generates a request (Q, He) regarding each parameter value e and inputs the request (Q, He) to the request queue G (step 913). The selection unit 314 waits until each request input to the request queue G has at least one leaf node, and repeats the processing of step 910 and subsequent steps to evaluate the next parameter value.

If the execution position has not reached the position of the new element of the set P (NO in step 903), the execution unit 313 checks whether the execution position has reached the end point of the adjustment program (step 904).

If the execution position has reached the end point (YES in step 904), the selection unit 314 determines that the execution of the program image Q has succeeded, and updates the search tree T (step 909). The execution unit 313 then ends the execution of the procedure RUN(Q, H).

On the other hand, if the execution position has not reached the end point (NO in step 904), the execution unit 313 checks whether an execution error has occurred (step 905). If an execution error has occurred (YES in step 905), the selection unit 314 determines that the execution of the program image Q has failed, and performs the processing of step 909 and subsequent step.

On the other hand, if an execution error has not occurred (NO in step 905), the execution unit 313 compares the execution time of the program image Q with the value of the variable TM (step 906). If the execution time is greater than the value of the variable TM (YES in step 906), the selection unit 314 determines that the execution of the program image Q has failed, and performs the processing of step 909 and subsequent step.

On the other hand, if the execution time is less than or equal to the value of the variable TM (NO in step 906), the information processing apparatus 301 repeats the processing of step 901 and subsequent steps.

If the execution of the program image Q has failed, the selection unit 314 adds the following nodes and edges to the search tree T in step 909.

(F1) Node (p, e) indicating each triad (c, d, e) included in the history H (F2) Edge linking two consecutive nodes (p, e)

(F3) Leaf node ERROR indicating a failure of execution (F4) Edge linking a node (p, e) immediately preceding the leaf node ERROR and the leaf node ERROR On the other hand, if the execution of the program image Q is successful, the selection unit 314 adds the following nodes and edges to the search tree T in step 909.

(F11) Node (p, e) indicating each triad (c, d, e) included in the history H (F12) Edge linking two consecutive nodes (p, e)

(F13) Leaf node OK(u, r) including a speed-up rate u and an accuracy r and indicating a success of execution (F14) Edge linking a node (p, e) immediately preceding the leaf node OK(u, r) and the leaf node OK(u, r)

The speed-up rate u represents the degree to which the execution speed is increased by applying the AC technique to the program 321. The accuracy r represents the accuracy of the processing result.

In step 910, when the first subset E' is generated from the set E, the generation unit 312 determines whether to include the parameter value e, which is each element of the set E, in the subset E' using a certain determiner. For example, a learning model generated in advance by machine learning may be used as the determiner.

In this case, the generation unit 312 analyzes the source code portion subsequent to the position c of the triad p=(c, d, E) by the compiler and extracts feature information of the source code portion. For example, as the feature information, a set of information representing features of the source code portion, such as the number of statements and variables in a loop, the number of types of operators of an expression, the number of types of data types, and a pattern of data dependency, is extracted. It is noted that the term of "the number of statements" may be generally referred to as "the number of sentences", "the number of lines of source code", "SLOC:source lines of code", "LOC:lines of code", and the like.

Next, the generation unit 312 inputs the extracted feature information and the parameter value e to the determiner to obtain a determination result indicating whether to apply the parameter value e to the program 321. If the determination result indicating that the parameter value e is applied is obtained, the generation unit 312 adds the parameter value e to the subset E'.

On the other hand, when the second and subsequent subsets E' are generated from the set E, the generation unit 312 uses the search tree T to add unevaluated parameter values e that have not been evaluated yet to the subset E' in the following procedure.

(J1) The generation unit 312 identifies one or more nodes (p, e) that have at least one edge reaching a leaf node indicating a success of execution and that have the same triad p in the search tree T. The generation unit 312 determines, as a parameter value es, the parameter value e with the greatest degree to which the AC technique is applied among the parameter values e included in the identified nodes (p, e).

(J2) The generation unit 312 identifies one or more nodes (p, e) that do not have an edge reaching a leaf node indicating a success of execution and that have the same triad p in the search tree T. Next, the generation unit 312 selects one or more parameter values e with a greater degree to which the AC technique is applied than that of the parameter value es from among the parameter values e included in the identified nodes (p, e). The generation unit 312 determines, as a parameter value ef, the parameter value e having the smallest degree to which the AC technique is applied among the selected parameter values e. At this point, at least one of the parameter value es or the parameter value ef is determined.

(J3) When the parameter value es does not exist and the parameter value ef exists, the generation unit 312 identifies unevaluated parameter values e with a smaller degree to which of the AC technique is applied than that of the parameter value ef. The generation unit 312 adds, to the subset E', the minimum value, the maximum value, and a central parameter value separated from the minimum value and the maximum value by an equal distance from among the identified parameter values e.

(J4) When the parameter value es exists and the parameter value ef does not exist, the generation unit 312 identifies unevaluated parameter values e with a greater degree to which the AC technique is applied than that of the parameter value es. The generation unit 312 adds the minimum value, the maximum value, and the central parameter value to the subset E' from among the identified parameter values e.

(J5) When the parameter value es and the parameter value ef exist, the generation unit 312 identifies unevaluated parameter values e existing between the parameter value es and the parameter value ef. The generation unit 312 adds the minimum value, the maximum value, and the central parameter value to the subset E' from among the identified parameter values e. When there is no unevaluated parameter value e between the parameter value es and the parameter value ef, the generation unit 312 generates an empty set as the subset E'.

In the procedures (J3) to (J5), if the number of identified parameter values e is less than 3, the generation unit 312 adds all the identified parameter values e to the subset E'. If the number of identified parameter values e is an even number of 4 or greater and there is no central parameter value, the generation unit 312 selects a parameter value with a greater degree to which the AC technique is applied among the two parameter values near the center.

For example, a case is assumed where E={0, 1, 2, 3, 4, 5, 6}, where the smaller the parameter value e, the smaller the degree to which the AC technique is applied, and where the greater the parameter value e, the greater the degree to which the AC technique is applied.

When the parameter value es does not exist and the parameter value ef=5, {0, 1, 2, 3, 4} is identified through the procedure (J3) and E'={0, 2, 4} is obtained. When the parameter value ef does not exist and the parameter value es=1, {2, 3, 4, 5, 6} is identified through the procedure (J4) and E'={2, 4, 6} is obtained.

When the parameter value es=0 and the parameter value ef=6, {1, 2, 3, 4, 5} is identified through the procedure (J5) and E'={1, 3, 5} is obtained. When the parameter value es=0 and the parameter value ef=5, {1, 2, 3, 4} is identified through the procedure (J5) and E'={1, 3, 4} is obtained.

Figure 10:
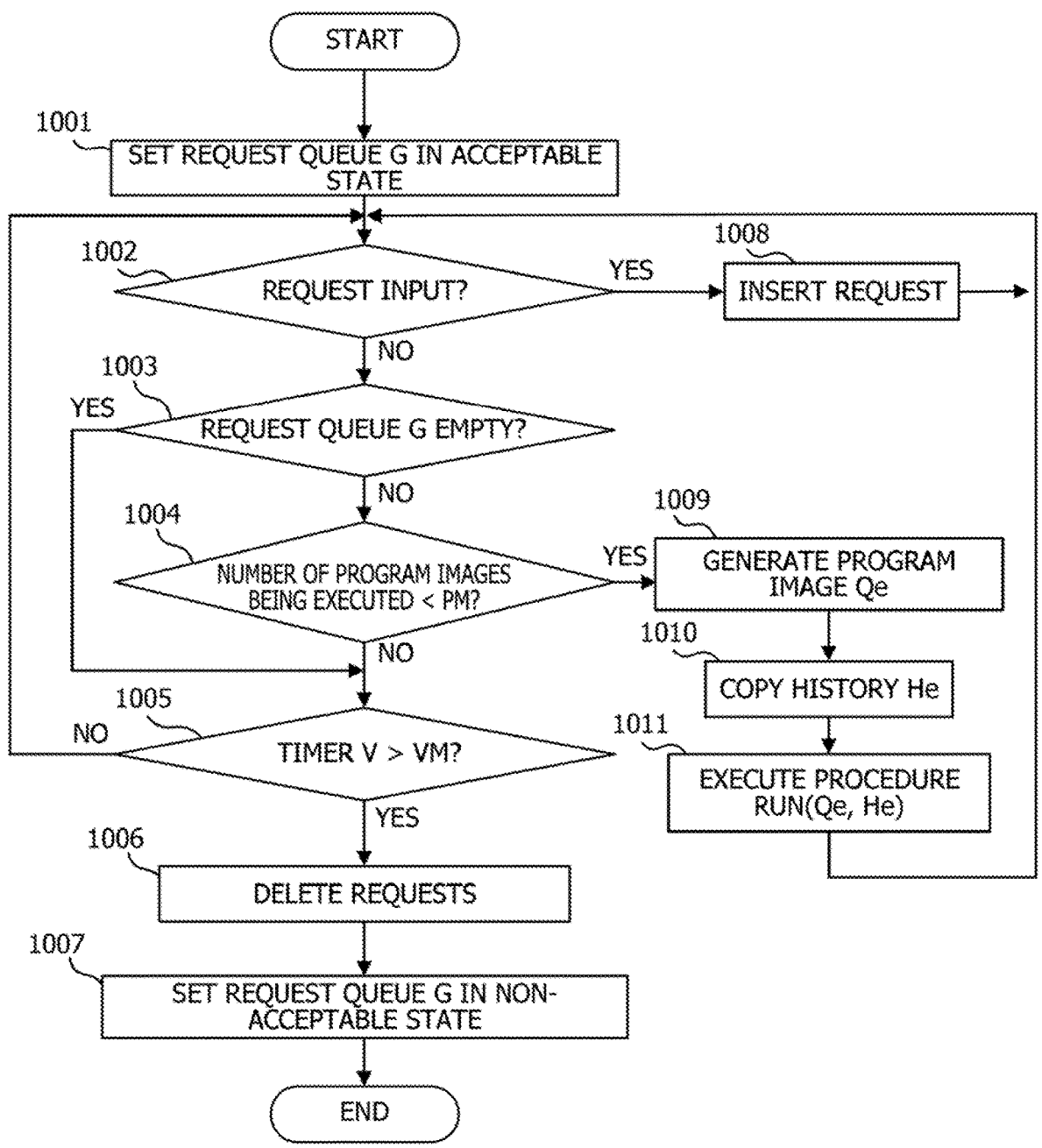
FIG. 10 is a flowchart of a process for a request queue.

FIG. 10 is a flowchart illustrating an example of a process for the request queue G executed in step 406 of FIG. 4. First, the selection unit 314 sets the request queue G in an acceptable state (step 1001), and checks whether a new request (Q, He) s input to the request queue G through the processing of step 913 in FIG. 9B (step 1002).

If the request (Q, He) is input (YES in step 1002), the selection unit 314 inserts the request (Q, He) to the request queue G (step 1008), and the information processing apparatus 301 repeats the processing of step 1002 and subsequent steps. A method for determining the position where the request (Q, He) is to be inserted will be described later.

If the request (Q, He) is not input (NO in step 1002), the selection unit 314 checks whether the request queue G is empty (step 1003). If the request queue G is not empty (NO in step 1003), the selection unit 314 compares the number of program images being executed with the value of the variable PM (step 1004).

If the number of program images being executed is less than the value of the variable PM (YES in step 1004), the selection unit 314 deletes the request (Q, He) at the head of the request queue G from the request queue G. The selection unit 314 copies the program image Q of the deleted request (Q, He) to generate a program image Qe (step 1009), and copies the history He for the program image Qe (step 1010).

Next, the execution unit 313 executes the procedure RUN(Qe, He) (step 1011), and the information processing apparatus 301 repeats the processing of step 1002 and subsequent steps.

If the number of program images being executed has reached the value of the variable PM (NO in step 1004), the selection unit 314 compares the elapsed time indicated by the timer V with the value of the variable VM (step 1005). If the elapsed time is less than or equal to the value of the variable VM (NO in step 1005), the information processing apparatus 301 repeats the processing of step 1002 and subsequent steps. If the request queue G is empty (YES in step 1003), the information processing apparatus 301 performs the processing of step 1005 and subsequent steps.

If the elapsed time is greater than the value of the variable VM (YES in step 1005), the selection unit 314 deletes all the requests existing in the request queue G (step 1006). The selection unit 314 sets the request queue G in a non-acceptable state (step 1007), and waits for the end of the execution of all the program images. It is assumed that the execution of the process request queue G ends when execution of all the program images ends.

According to the process for the request queue G illustrated in FIG. 10, execution of a new procedure RUN(Qe, He) is controlled so that the number of program images being executed does not exceed the value of the variable PM. In the request queue G, the requests (Q, He) are sorted in the following order of priority and are processed in order from the top request.

(L1) A case is assumed where the number of edges reaching a leaf node indicating a failure of execution is less for a node $\alpha 1$ than for a node $\beta 1$ in the search tree T. In this case, a request regarding the parameter value derived from the node $\alpha 1$ is inserted at a position closer to the head than a request regarding the parameter value derived from the node $\beta 1$.

A parameter value derived from a node refers to a parameter value of an AC technique that is applied at a position following the position indicated by the node after the AC technique and the parameter value recorded in the node are applied.

(L2) A case is assumed where a leaf node reached from the edge of a node $\alpha 2$ indicates a higher speed-up rate u than a leaf node reached from the edge of a node $\beta 2$ in the search tree T. In this case, the request regarding the parameter value derived from the node $\alpha 2$ is inserted at a position closer to the head than the request regarding the parameter value derived from the node β2. When the speed-up rates u of the two leaf nodes are equal to each other, the priority order (L3) is applied.

(L3) A case is assumed where a leaf node reached from the edge of a node α3 has a higher accuracy r than a leaf node reached from the edge of a node β3 in the search tree T. In this case, the request regarding the parameter value derived from the node α3 is inserted at a position closer to the head than the request regarding the parameter value derived from the node β3.

(L4) A case is assumed where a node α4 is deeper than a node Γ4 from the root node in the search tree T. In this case, the request regarding the parameter value derived from the node α4 is inserted at a position closer to the head than the request regarding the parameter value derived from the node β4.

In step 1008, the selection unit 314 determines the position to which the request (Q, He) is to be inserted, based on the priority orders (L1) to (L4).

By applying the priority order (L1), the request regarding the parameter value e, for which a possibility of a failure of execution is low, is preferentially executed. Thus, it is possible to preferentially search for a path having such a low possibility in the search tree T.

By applying the priority order (L2), the request regarding the parameter value e, for which a possibility of an increased speed is high, is preferentially executed. Thus, it is possible to preferentially search for a path having such a high possibility in the search tree T.

By applying the priority order (L3), the request regarding the parameter value e, for which a possibility of obtaining a highly accurate processing result is high, is preferentially executed. Thus, it is possible to preferentially search for a path having such a high possibility in the search tree T.

By applying the priority order (L4), the request regarding the parameter value e of the AC technique close to the end point is preferentially executed. Thus, it is possible to quickly end the execution of the program image Q and generate a leaf node.

Next, a specific example of the search process for the adjustment program illustrated in FIG. 8 will be described. In this example, the variables VM, PM, and TM are set to values as follows: VM=48 (time); PM=8 (pieces); and TM=1200 (seconds).

In step 408 of FIG. 4, the procedure RUN(P1000, H) is executed with Q=P1000 and H={⊥}. When the execution position reaches the position of the pragma 801 during execution of the program image P1000, the first subset E1 is generated from E={16, 8} because the triad p1 indicated by the pragma 801 has never been processed.

In this case, feature information is extracted from a source code portion representing a loop and written in the next line of the pragma 801. The extracted feature information and each of the parameter value "16" and the parameter value "8" are input to the determiner. The determiner determines whether to apply the AC parallelization based on each parameter value to the program image P1000. When the determiner determines to apply both of the parameter value "16" and the parameter value "8", E'={16, 8} is obtained.

In this case, a request (P1000, 1116) including H16={⊥, (5, parallel, 16)} and a request (P1000, H8) including H8={⊥, (5, parallel, 8)} are input to the request queue G. The procedure RUN(P1000, H) is in a waiting state until each of the two requests has a leaf node.

Since the request queue G is in the acceptable state, the request (P1000, H8) is inserted into the request queue G. Since the number of program images being executed is 0, the request (P1000, H8) is deleted from the request queue G, and the program image P1000 is copied to generate a program image P1001. The procedure RUN(P1001, H8) is executed using the program image P1001 and the history H8 as arguments.

When the execution position reaches the position of the pragma 701 during execution of the program image P1001, the checkpoint c1 indicated by the pragma 701 is executed. As a result, if it is determined that the accuracy of the value of the variable x is out of the allowable range, the following nodes and edge are added to the search tree T as a path corresponding to H8={⊥, (5, parallel, 8)}.

(F21) Root node SOT
(F22) Node (p1, 8)
(F23) Edge linking the root node BOT and the node (p1, 8)

A leaf node ERROR indicating a failure of execution and an edge linking the node (p1, 8) and the leaf node ERROR are also added to the search tree T.

The request (P1000, H16) is processed in the same manner as the request (P1000, H8). For example, the program image P1000 is copied to generate a program image P1002, and the procedure RUN(P1002, H16) is executed.

When the execution position reaches the position of the pragma 701 during execution of the program image P1002, the checkpoint c1 indicated by the pragma 701 is executed. As a result, if it is determined that the accuracy of the value of the variable x is within the allowable range, the program image P1002 is continuously executed, the program image is copied at each of the positions of the pragma 802 and the pragma 803, and a new procedure RUN(Qe, He) is executed. The checkpoint c2, the checkpoint c3, and the checkpoint c4 are executed at the positions of the pragma 702, the pragma 703, and the pragma 704, respectively.

Thus, the execution position reaches the end point corresponding to the executable statement 507, and {⊥, (5, parallel, 16), (11, loop perforation, 2), (21, precision, 64)} is obtained as the history H at that time. At this time, the following nodes and edges are added to the search tree T as a path corresponding to the history H.

(F31) Node (p1, 16)
(F32) Node (p2, 2)
(F33) Node (p3, 64)
(F34) Edge linking the root node BOT and the node (p1, 16)
(F35) Edge linking the node (p1, 16) and the node (p2, 2)
(F36) Edge linking the node (p2, 2) and the node (p3, 64)

A leaf node OK(5.2, 0.98) indicating a success of execution and an edge linking the node (p3, 64) and the leaf node OK(5.2, 0.98) are also added to the search tree T. The leaf node OK(5.2, 0.98) indicates that the speed-up rate u=5.2 and the accuracy r=0.98.

In the procedure RUN(P1000, H) that is in the waiting state, when all the requests input to the request queue G come to have respective leaf nodes in the search tree T, a new subset E' is generated to evaluate the next parameter value. However, since all the parameter values of the set. E of the triad p1 have been evaluated and there is no unevaluated parameter value, the new subset E' becomes an empty set. Consequently, the execution of the procedure RUN (P1000, H) ends. Thus, when execution of all the program images being executed ends after the elapsed time of the timer V exceeds the value of the variable VM, the execution of the request queue G ends.

Figure 11:
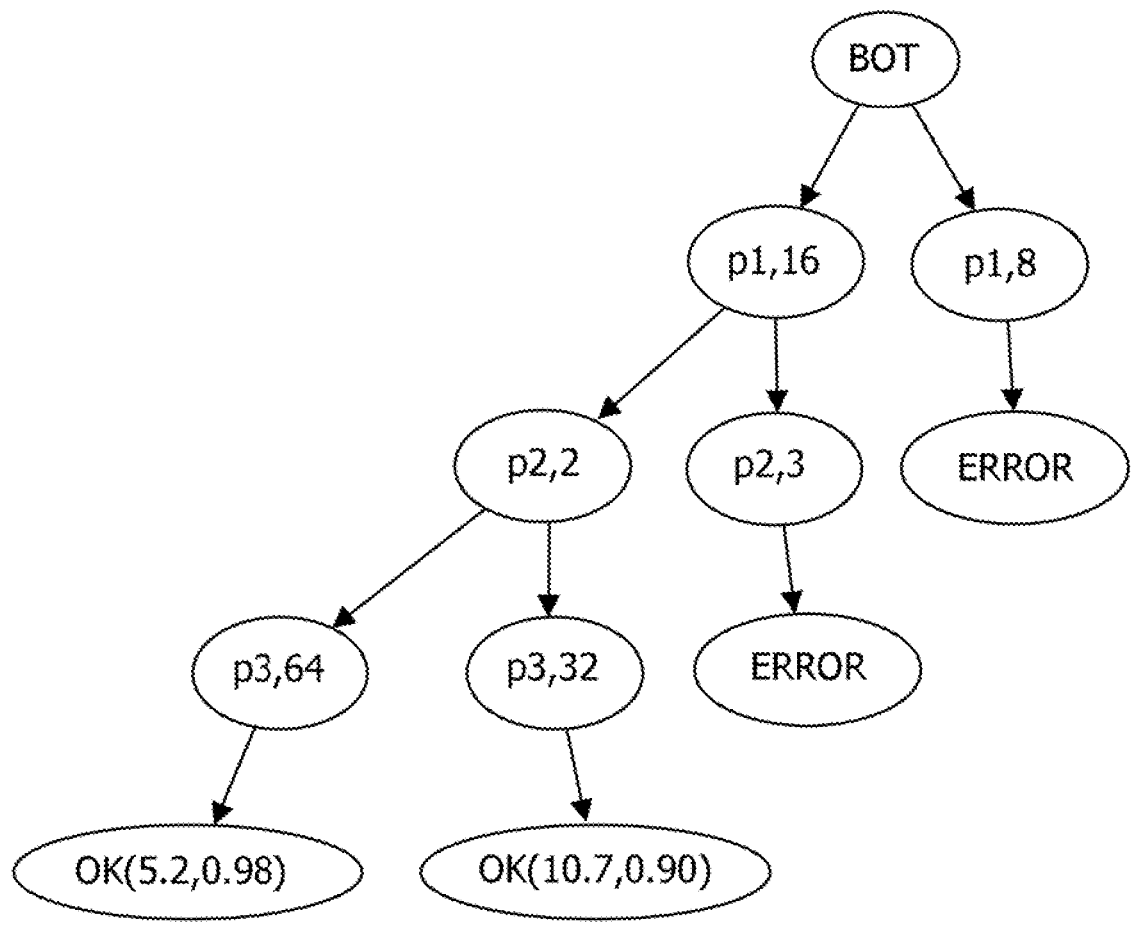
FIG. 11 is a diagram illustrating a search tree.

FIG. 11 illustrates an example of the search tree T when execution of the request queue G ends. The leaf node OK(5.2, 0.98) and the leaf node OK(10.7, 0.90) are leaf nodes indicating a success of execution. The speed-up rate u and the accuracy r of the leaf node OK(5.2, 0.98) are 5.2 and 0.98, respectively. On the other hand, the speed-up rate u and the accuracy r of the leaf node OK(10.7, 0.90) are 10.7 and 0.90, respectively.

Therefore, the processing result indicated by the leaf node OK(10.7, 0.90) has a higher speed-increasing effect than the processing result indicated by the leaf node OK(5.2, 0.98). On the other hand, the processing result indicated by the leaf node OK(5.2, 0.98) is less deteriorated in the calculation accuracy than the processing result indicated by the leaf node OK(10.7, 0.90).

In this case, the selection unit 314 selects the leaf node OK(10.7, 0.90) having the highest speed-increasing effect. Next, the selection unit 314 sequentially traces the nodes from the leaf node to the root node BOT to acquire "16", "2", and "32" as the parameter values of the AC technique indicated by the three triads p1, p2, and p3, respectively. The selection unit 314 determines a combination of the AC techniques indicated by the three triads p1, p2, and p3 and the obtained parameter values as an optimum combination of the AC techniques and the parameter values.

Next, the selection unit 314 applies the optimum combination of the AC techniques and the parameter values to the adjustment program to generate the AC-applied program 327.

FIG. 12 illustrates an example of the AC-applied program 327 generated from the adjustment program illustrated in FIG. 8. In the AC-applied program 327 illustrated in FIG. 12, the pragmas 801 to 803 illustrated in FIG. 8 are replaced with pragmas 1201 to 1203, respectively.

The pragma 1201 indicates that the parameter value of the AC parallelization on line 5 is "16". The pragma 1202 indicates that the parameter value of the loop perforation on line 11 is "2". The pragma 1203 indicates that the parameter value for the bit number reduction on line 21 is "32".

The selection unit 314 extracts information on the parameter value for which execution is successful and the parameter value for which execution is unsuccessful from individual nodes of the search tree T illustrated in FIG. 11, and records the extracted information in the data for learning 325. When the AC technique is applied to a program different from the program 321, the data for learning 325 is used as input data for a learning process of generating a determiner. By learning the parameter values included in the search tree T and whether execution is successful or not, it is possible to generate a determiner that improves the success rate of execution.

Figure 13:
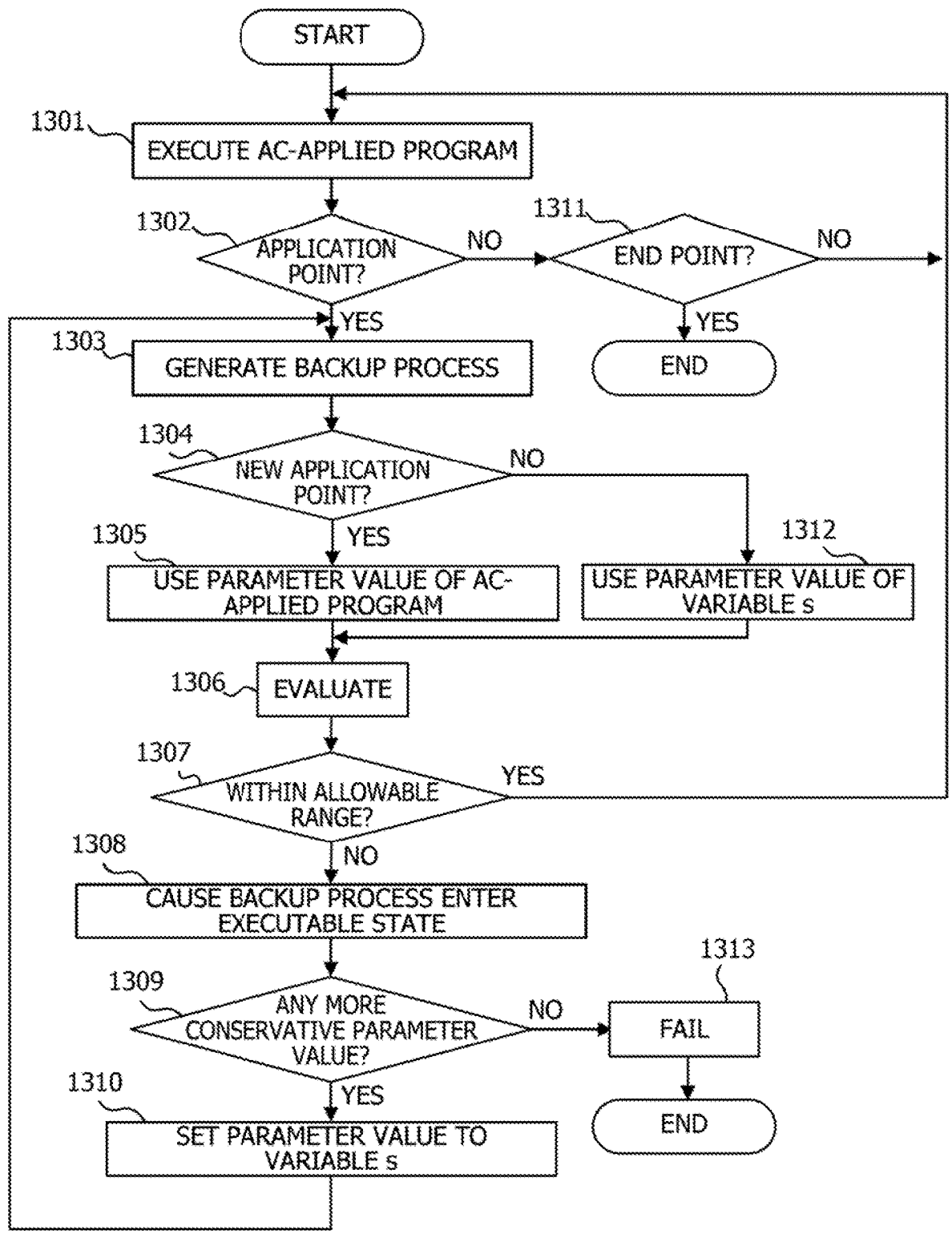
FIG. 13 is a flowchart of an AC application process.

FIG. 13 is a flowchart illustrating an example of an AC application process performed by the information processing apparatus 301 illustrated in FIG. 3 in the operation mode. First, the execution unit 313 executes the program image of the AC-applied program 327 using the input file 326 (step 1301), and checks whether the execution position has reached the application point of the AC technique (step 1302). The application point of the AC technique indicates a position where a pragma is written which indicates that the AC technique is to be applied.

If the execution position has reached the application point of the AC technique (YES in step 1302), the execution unit 313 copies the program image being executed and generates a program image of a backup process (step 1303). The execution unit 313 sets the backup process in a suspended state.

Next, the execution unit 313 checks whether the reached application point is an application point of a new AC technique (step 1304). The application point of the new AC technique represents an application point of the AC technique that has never been applied after the start of execution of the AC-applied program 327.

When the reached application point is an application point of a new AC technique (YES in step 1304), the execution unit 313 applies the AC technique at the application point to the program image using the parameter value written in the AC-applied program 327. The execution unit 313 continues execution of the program image.

Before reaching the application point of the next AC technique, the selection unit 314 evaluates the accuracy of the value of the variable at one or more checkpoints (step 1306) and determines whether the accuracy is within the allowable range (step 1307). If the accuracy is within the allowable range (YES in step 1307), the information processing apparatus 301 repeats the processing of step 1301 and subsequent steps for an instruction after the position of the checkpoint.

On the other hand, if the accuracy is out of the allowable range (NO in step 1307), the execution unit 313 aborts the execution of the program image being executed and causes the backup process to enter the executable state from the suspended state (step 1308).

The selection unit 314 refers to a node corresponding to the triad p of the immediately preceding application point among the nodes included in the search tree 324, and checks whether a more conservative parameter value exists (step 1309). A more conservative parameter value refers to a parameter value with a smaller degree to which the AC technique is applied than that of the parameter value used at the immediately preceding application point.

If a more conservative parameter value is present in any of the nodes referred to (YES in step 1309), the selection unit 314 obtains the parameter value from the node and sets the parameter value to a variable s (step 1310). The process returns to the immediately preceding application point, and the information processing apparatus 301 repeats the processing of step 1303 and subsequent steps.

In this case, it is determined that the application point is not an application point of a new AC technique (NO in step 1304), and the execution unit 313 applies the AC technique at the application point to the program image using the parameter value set in the variable s (step 1312). However, when the parameter value set in the variable s indicates that the AC technique is not to be applied, the execution unit 313 does not apply the AC technique at the application point to the program image. The information processing apparatus 301 then performs the processing of step 1306 and subsequent steps.

If the execution position has not reached the application point of the AC technique (NO in step 1302), the execution unit 313 checks whether the execution position has reached the end point of the AC-applied program 327 (step 1311). If the execution position has not reached the end point (NO in step 1311), the information processing apparatus 301 repeats the processing of step 1301 and subsequent steps. If the execution position has reached the end point (YES in step 1311), the information processing apparatus 301 ends the process.

If a more conservative parameter value does not exist (NO in step 1309), the selection unit 314 determines that the execution of the AC-applied program 327 has failed (step 1313), and the information processing apparatus 301 ends the process.

For example, depending on the processing-target data included in the input file 326, the accuracy of the value of the variable result at the checkpoint c4 may be out of the allowable range at the position of the pragma 704 illustrated in FIG. 12. In this case, among the nodes included in the search tree T illustrated FIG. 11, the node (p3, 64) corresponding to the triad p3 at the application point indicated by the pragma 1203 is referred to, and the parameter value "64" that is more conservative than the parameter value "32" written in the pragma 1203 is obtained.

Since the node (p3, 64) has an edge reaching the leaf node OK(5.2, 0.98), execution may be successful by using the parameter value "64". Since the parameter value "64" indicates that the AC technique is not to be applied, the AC-applied program 327 is executed again from the position of the pragma 1203 without applying the bit number reduction indicated by the pragma 1203.

As described above, by selecting a more conservative parameter value using the search tree T generated in the adjustment mode, it is possible to reduce the probability of a failure of execution even when the accuracy out of the allowable range is obtained for the processing-target data in the operation mode.

The configuration of the information processing apparatus 101 illustrated in FIG. 1 and the configuration of the information processing apparatus 301 illustrated in FIG. 3 are merely examples. Some constituents of the information processing apparatuses 101 and 301 may be omitted or changed in accordance with the usage or conditions of the information processing apparatuses 101 and 301. For example, when the information processing apparatus 301 illustrated in FIG. 3 does not operate in the operation mode, the output unit 315 may be omitted.

The flowcharts illustrated in FIGS. 2, 4, 9A, 9B, 10, and 13 are merely examples, and some of processing steps may be omitted or changed in accordance with the configuration or conditions of the information processing apparatus. For example, when the information processing apparatus 301 illustrated in FIG. 3 does not operate in the operation mode, the AC application process illustrated in FIG. 13 may be omitted.

In step 910 of FIG. 9B, the generation unit 312 may generate the first subset E' from the set E without using a determiner. For example, the generation unit 312 may generate the subset E' including the minimum value, the maximum value, and a central parameter value among the parameter values e included in the set E.

The programs illustrated in FIGS. 5, 7, 8, and 12 are merely examples, and the programs may change in accordance with the usage or conditions of the information processing apparatus 301. The allowable accuracy information 323 illustrated in FIG. 6 and the search tree T illustrated in FIG. 11 are merely examples, and the allowable accuracy information 323 and the search tree T may change in accordance with the program.

Figure 14:
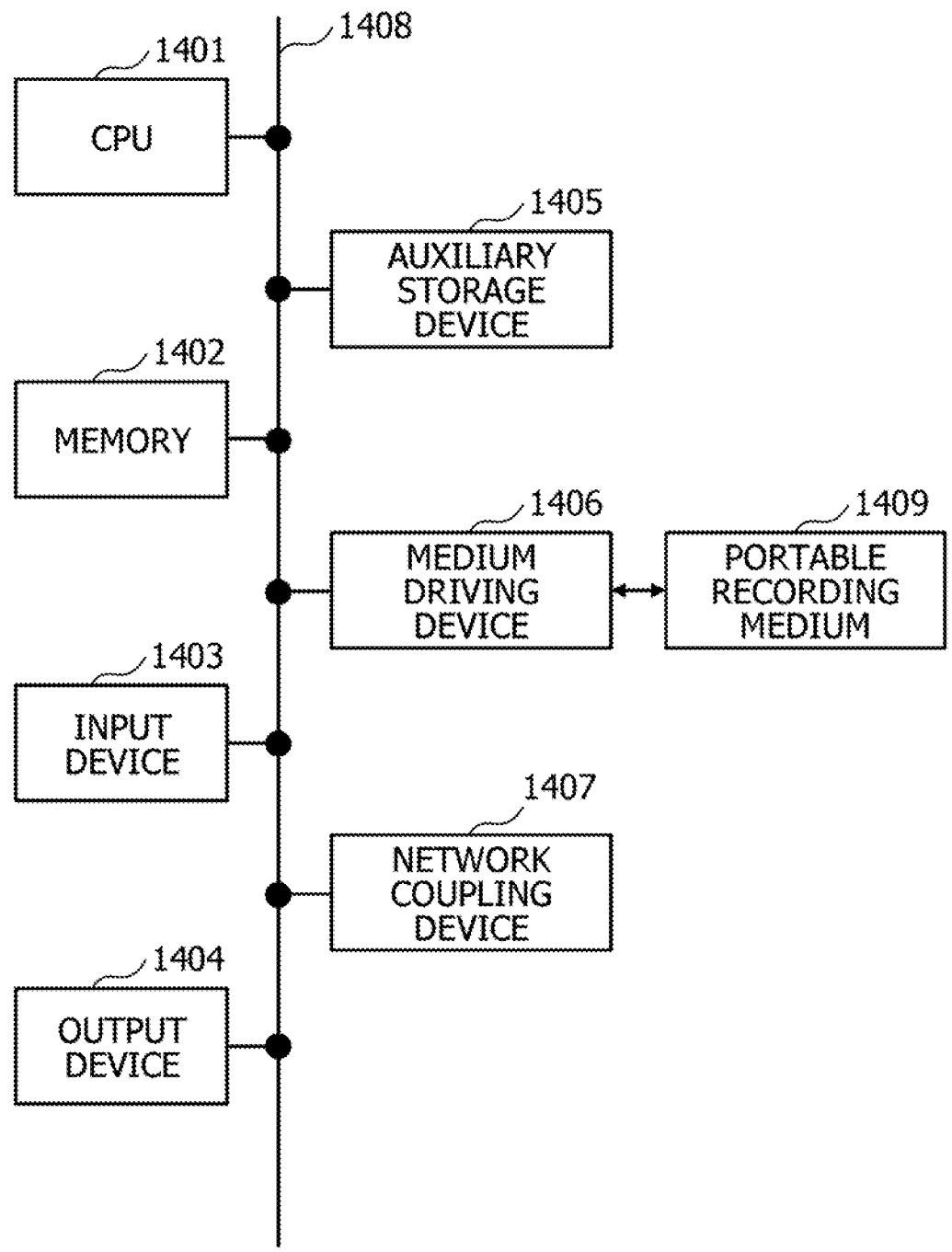
FIG. 14 is a hardware configuration diagram of the information processing apparatus.

FIG. 14 illustrates an example of a hardware configuration of the information processing apparatus 101 illustrated in FIG. 1 and the information processing apparatus 301 illustrated in FIG. 3. The information processing apparatus illustrated in FIG. 14 includes a central processing unit (CPU) 1401, a memory 1402, an input device 1403, an output device 1404, an auxiliary storage device 1405, a medium driving device 1406, and a network coupling device 1407. These constituents are pieces of hardware and are coupled to each other by a bus 1408.

The memory 1402 is, for example, a semiconductor memory such as a read-only memory (ROM), a random access memory (RAM), or a flash memory, and stores therein programs and data used for processing. The memory 1402 may be used as the storage unit 111 illustrated in FIG. 1 or the storage unit 311 illustrated in FIG. 3.

The CPU 1401 (processor) executes, for example, a program using the memory 1402 to operate as the generation unit 112, the execution unit 113, and the selection unit 114 illustrated in FIG. 1. The CPU 1401 executes a program using the memory 1402 to operate as the generation unit 312, the execution unit 313, and the selection unit 314 illustrated in FIG. 3.

The input device 1403 is, for example, a keyboard, a pointing device, or the like and is used by an operator or a user to input an instruction or information. The output device 1404 is, for example, a display device, a printer, a speaker, or the like and is used for outputting an inquiry or an instruction and a processing result to an operator or a user. The processing result may be the AC-applied program 327 or the processing result 328. The output device 1404 may be used as the output unit 315 illustrated in FIG. 3.

The auxiliary storage device 1405 is, for example, a magnetic disk drive, an optical disc drive, a magneto-optical disk drive, a tape drive, or the like. The auxiliary storage device 1405 may be a hard disk drive or a flash memory. The information processing apparatus may store programs and data in the auxiliary storage device 1405, and use these programs and data by loading them to the memory 1402. The auxiliary storage device 1405 may be used as the storage unit 111 illustrated in FIG. 1 and the storage unit 311 illustrated in FIG. 3.

The medium driving device 1406 drives a portable recording medium 1409, and accesses content recorded thereon. The portable recording medium 1409 is a memory device, a flexible disk, an optical disc, a magneto-optical disk, or the like. The portable recording medium 1409 may be a compact disc read only memory (CD-ROM), a digital versatile disc (DVD), a Universal Serial Bus (USB) memory, or the like. An operator or a user may store programs and data on the portable recording medium 1409, and use these programs and data by loading them to the memory 1402.

As described above, a computer-readable recording medium that stores a program and data used for processing is a physical (non-transitory) storage medium such as the memory 1402, the auxiliary storage device 1405, or the portable recording medium 1409.

The network coupling device 1407 is a communication interface circuit that is coupled to a communication network such as a local area network (LAN) or a wide area network (WAN) and that performs data conversion involved in communication. The information processing apparatus may receive programs and data from external devices via the network coupling device 1407, and load these programs and data to the memory 1402 for use, The network coupling device 1407 may be used as the output unit 315 illustrated in FIG. 3.

The information processing apparatus does not have to include all of the constituents illustrated in FIG. 14, and some of the constituents may be omitted in accordance with the usage or conditions of the information processing apparatus. For example, if an interface with an operator or a user is unnecessary, the input device 1403 and the output device 1404 may be omitted, In a case where the portable recording medium 1409 or the communication network is not used, the medium driving device 1406 or the network coupling device 1407 may be omitted.

While the embodiment of the disclosure and advantages thereof have been described in detail, those skilled in the art may make various changes, additions, and omissions without departing from the scope of the disclosure, which is set forth in the appended claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a storage device that stores a program; and
a processor that executes the program, the processor is configured to perform processing including:
adding a checkpoint to a program based on allowable accuracy information to generate a checkpoint-added program, the allowable accuracy information indicating an allowable range of accuracy of a value of each variable at each position in the program;
analyzing the source code of the program by applying a compiler technique, to generate a set including a plurality of triads, each triad including a position in the program to which an approximate computing, AC, technique is applied, a type of the AC technique applied to the position, and a set of parameter values of the AC technique to be applied, a parameter value represents a degree to which the AC technique of the type is applied, the set of parameter values are sorted in advance in ascending order of the degree to which the AC technique is applied, an element with a smaller degree to which the AC technique is applied is an element with a less speed-increasing effect and a less deterioration in calculation accuracy, an element with a larger degree to which the AC technique is applied is an element with a greater speed increasing effect and a greater deterioration in calculation accuracy, the set of parameter values includes a parameter value indicating that the AC technique is not to be applied as an element with the smallest degree to which the AC technique is applied, and the AC technique includes one of AC parallelization, loop perforation, task skipping, and bit number reduction;
generating an adjustment program by inserting a pragma for applying each element of the set including the plurality of triads into the checkpoint-added program;
setting values of a first variable, a second variable, and a third variable used for controlling the search process, the first variable represents an upper limit of the processing time of the search process, the second variable represents an upper limit of the number of processes that operate simultaneously in the search process, and the third variable represents an upper limit of the execution time of one process, the values of the first variable, the second variable, and the third variable are determined by executing the program in advance;
initializing a search tree comprising a tree data structure in which each node records an AC technique and a parameter of the AC technique that is attempted in the search process;
starting execution of a request queue comprising a plurality of requests, each request defining a program image and a combination of an AC technique and a parameter value;
resetting a timer to zero and measuring elapsed time from the start of the execution of the request queue;
starting execution of the adjustment program using an input file that includes adjustment data input to the program in the search process, executing a procedure using a program image and a combination of an AC technique and a parameter value, and waiting for the end of the execution of the request queue, when the execution of the request queue is ended the search tree includes the combinations of the AC technique and the parameter value capable of performing the fastest calculation with the accuracy within the allowable range indicated by the allowable accuracy information;
selecting a leaf node of the search tree determined to have an optimum combination of the AC techniques and the parameter values by sequentially tracing the nodes from the leaf node to the root node of the search tree;
generating an AC-applied program by applying the determined AC techniques and parameter values to the adjustment program; and
updating data for learning by extracting information on the parameter value for which execution is successful and the parameter value for which execution is unsuccessful from individual nodes of the search tree,
during the execution of the request queue, all the requests existing in the request queue are deleted if the number of program images being executed reaches the second variable and if the timer becomes greater than the value of the first variable.

2. A non-transitory computer-readable storage medium for storing a information processing program which causes a processor to perform processing, the processing comprising:
adding a checkpoint to a program based on allowable accuracy information to generate a checkpoint-added program, the allowable accuracy information indicating an allowable range of accuracy of a value of each variable at each position in the program;
analyzing the source code of the program by applying a compiler technique, to generate a set including a plurality of triads, each triad including a position in the program to which an approximate computing, AC, technique is applied, a type of the AC technique applied to the position, and a set of parameter values of the AC technique to be applied, a parameter value represents a degree to which the AC technique of the type is applied, the set of parameter values are sorted in advance in ascending order of the degree to which the AC technique is applied, an element with a smaller degree to which the AC technique is applied is an element with a less speed-increasing effect and a less deterioration in calculation accuracy, an element with a larger degree to which the AC technique is applied is an element with a greater speed increasing effect and a greater deterioration in calculation accuracy, the set of parameter values includes a parameter value indicating that the AC technique is not to be applied as an element with the smallest degree to which the AC technique is applied, and the AC technique includes one of AC parallelization, loop perforation, task skipping, and bit number reduction;

generating an adjustment program by inserting a pragma for applying each element of the set including the plurality of triads into the checkpoint-added program;

setting values of a first variable, a second variable, and a third variable used for controlling the search process, the first variable represents an upper limit of the processing time of the search process, the second variable represents an upper limit of the number of processes that operate simultaneously in the search process, and the third variable represents an upper limit of the execution time of one process, the values of the first variable, the second variable, and the third variable are determined by executing the program in advance;

initializing a search tree comprising a tree data structure in which each node records an AC technique and a parameter of the AC technique that is attempted in the search process;

starting execution of a request queue comprising a plurality of requests, each request defining a program image and a combination of an AC technique and a parameter value;

resetting a timer to zero and measuring elapsed time from the start of the execution of the request queue;

starting execution of the adjustment program using an input file that includes adjustment data input to the program in the search process, executing a procedure using a program image and a combination of an AC technique and a parameter value, and waiting for the end of the execution of the request queue, when the execution of the request queue is ended the search tree includes the combinations of the AC technique and the parameter value capable of performing the fastest calculation with the accuracy within the allowable range indicated by the allowable accuracy information;

selecting a leaf node of the search tree determined to have an optimum combination of the AC techniques and the parameter values by sequentially tracing the nodes from the leaf node to the root node of the search tree;

generating an AC-applied program by applying the determined AC techniques and parameter values to the adjustment program; and updating data for learning by extracting information on the parameter value for which execution is successful and the parameter value for which execution is unsuccessful from individual nodes of the search tree, during the execution of the request queue, all the requests existing in the request queue are deleted if the number of program images being executed reaches the second variable and if the timer becomes greater than the value of the first variable.

3. An information processing method carried out by a computer, comprising:

adding a checkpoint to a program based on allowable accuracy information to generate a checkpoint-added program, the allowable accuracy information indicating an allowable range of accuracy of a value of each variable at each position in the program;

analyzing the source code of the program by applying a compiler technique, to generate a set including a plurality of triads, each triad including a position in the program to which an approximate computing, AC, technique is applied, a type of the AC technique applied to the position, and a set of parameter values of the AC technique to be applied, a parameter value represents a degree to which the AC technique of the type is applied, the set of parameter values are sorted in advance in ascending order of the degree to which the AC technique is applied, an element with a smaller degree to which the AC technique is applied is an element with a less speed-increasing effect and a less deterioration in calculation accuracy, an element with a larger degree to which the AC technique is applied is an element with a greater speed increasing effect and a greater deterioration in calculation accuracy, the set of parameter values includes a parameter value indicating that the AC technique is not to be applied as an element with the smallest degree to which the AC technique is applied, and the AC technique includes one of AC parallelization, loop perforation, task skipping, and bit number reduction;

generating an adjustment program by inserting a pragma for applying each element of the set including the plurality of triads into the checkpoint-added program;

setting values of a first variable, a second variable, and a third variable used for controlling the search process, the first variable represents an upper limit of the processing time of the search process, the second variable represents an upper limit of the number of processes that operate simultaneously in the search process, and the third variable represents an upper limit of the execution time of one process, the values of the first variable, the second variable, and the third variable are determined by executing the program in advance;

initializing a search tree comprising a tree data structure in which each node records an AC technique and a parameter of the AC technique that is attempted in the search process;

starting execution of a request queue comprising a plurality of requests, each request defining a program image and a combination of an AC technique and a parameter value;

resetting a timer to zero and measuring elapsed time from the start of the execution of the request queue;

starting execution of the adjustment program using an input file that includes adjustment data input to the program in the search process, executing a procedure using a program image and a combination of an AC technique and a parameter value, and waiting for the end of the execution of the request queue, when the execution of the request queue is ended the search tree includes the combinations of the AC technique and the parameter value capable of performing the fastest calculation with the accuracy within the allowable range indicated by the allowable accuracy information;

selecting a leaf node of the search tree determined to have an optimum combination of the AC techniques and the parameter values by sequentially tracing the nodes from the leaf node to the root node of the search tree;

generating an AC-applied program by applying the determined AC techniques and parameter values to the adjustment program; and updating data for learning by extracting information on the parameter value for which execution is successful and the parameter value for which execution is unsuccessful from individual nodes of the search tree, during the execution of the request queue, all the requests existing in the request queue are deleted if the number of program images being executed reaches the second variable and if the timer becomes greater than the value of the first variable.

* * * * *